(12) United States Patent
Sanz et al.

(10) Patent No.: US 9,732,408 B2
(45) Date of Patent: Aug. 15, 2017

(54) HEAT-TREATMENT OF AN ALLOY FOR A BEARING COMPONENT

(75) Inventors: Alejandro Sanz, Nieuwegein (NL); Alexander Vries De, Tiel (NL)

(73) Assignee: AKTIEBOLAGET SKF, Gothenburg (SE)

( * ) Notice: Subject to any disclaimer, the term of this patent is extended or adjusted under 35 U.S.C. 154(b) by 797 days.

(21) Appl. No.: 14/114,677

(22) PCT Filed: Apr. 26, 2012

(86) PCT No.: PCT/EP2012/057642
§ 371 (c)(1),
(2), (4) Date: Jan. 8, 2014

(87) PCT Pub. No.: WO2012/146653
PCT Pub. Date: Nov. 1, 2012

(65) Prior Publication Data
US 2014/0116581 A1    May 1, 2014

Related U.S. Application Data

(60) Provisional application No. 61/480,893, filed on Apr. 29, 2011, provisional application No. 61/480,903, filed on Apr. 29, 2011, provisional application No. 61/480,912, filed on Apr. 29, 2011, provisional application No. 61/480,944, filed on Apr. 29, 2011.

(51) Int. Cl.
| | | |
|---|---|---|
| *C22F 1/18* | (2006.01) | |
| *C22C 14/00* | (2006.01) | |
| *F16C 33/62* | (2006.01) | |
| *C22C 1/02* | (2006.01) | |

(52) U.S. Cl.
CPC ............... *C22F 1/183* (2013.01); *C22C 1/02* (2013.01); *C22C 14/00* (2013.01); *F16C 33/62* (2013.01); *F16C 2204/42* (2013.01)

(58) Field of Classification Search
CPC .................................. C22F 1/18; C22F 1/183
USPC .................................................. 148/669–671
See application file for complete search history.

(56) References Cited

U.S. PATENT DOCUMENTS

| | | |
|---|---|---|
| 2,893,864 A | 7/1959 | Harris et al. |
| 6,632,396 B1 | 10/2003 | Tetyukhin et al. |
| 6,800,243 B2 | 10/2004 | Tetyukhin et al. |
| 7,332,043 B2 | 2/2008 | Tetyukhin et al. |

(Continued)

FOREIGN PATENT DOCUMENTS

| | | |
|---|---|---|
| EP | 1225353 A1 | 7/2002 |
| EP | 1302554 A1 | 4/2003 |

(Continued)

*Primary Examiner* — Brian Walck
(74) *Attorney, Agent, or Firm* — Bryan Peckjian; SKF USA Inc. Patent Dept.

(57) ABSTRACT

A method for preparing titanium alloy that is created to be formed into a bearing component, wherein the titanium alloy comprises from 5 to 7 wt % Al, from 3.5 to 4.5 wt % V, from 0.5 to 1.5 wt % Mo, from 2.5 to 4.5 wt % Fe, from 2.5 to 4.5 wt % Fe, and from 0.05 to 2 wt % Cr. The alloy can optionally include one or more of the following elements: up to 2.5 wt % Zr, up to 2.5 wt % Sn, and up to 0.5 wt % C. The balance of the composition comprises Ti together with unavoidable impurities. The alloy is heated to a temperature T below the (α+β/β)-transition temperature Tβ and then quenched. The alloy is then aged a temperature of from 400 to 600° C.

34 Claims, 8 Drawing Sheets a)                    35 μm b)

(56) References Cited

U.S. PATENT DOCUMENTS

| | | |
|---|---|---|
| 2002/0191878 A1 | 12/2002 | Ueda |
| 2003/0164212 A1 | 9/2003 | Tetyukhin et al. |
| 2004/0231756 A1 | 11/2004 | Bania |
| 2005/0220381 A1 | 10/2005 | Smith |
| 2008/0011395 A1 | 1/2008 | Matsumoto |
| 2010/0320317 A1 | 12/2010 | Fanning |
| 2014/0116581 A1 | 5/2014 | Sanz et al. |
| 2014/0185977 A1 | 7/2014 | Sanz et al. |

FOREIGN PATENT DOCUMENTS

| | | |
|---|---|---|
| EP | 1582756 A2 | 10/2005 |
| JP | 11153140 A | 6/1999 |
| WO | 20100138886 A1 | 12/2010 |
| WO | 20120146650 A1 | 11/2012 |
| WO | 20120146653 A2 | 11/2012 | a) 35 μm b)

a) 35 μm b)

35 µm a)

b)

a)

b)

c) 35 μm d) 10 μm a) 35 μm b) 35 μm a    b

35 µm a    b    c

35 µm a b c

35 μm d a                                    b
                                        35 μm 16 mμ                                16 mμ
    a)                                   b)

a)

36 mµ b)

36 mµ c)

16 mµ d)

36 mµ e)

f)

HEAT-TREATMENT OF AN ALLOY FOR A BEARING COMPONENT

CROSS REFERENCE TO RELATED APPLICATIONS

This application is a National Stage application claiming the benefit of International Application Number PCT/EP2012/057642 filed on 26 Apr. 2012, which claims the benefit of:

U.S. Provisional Patent Application 61/480,893, filed on 29 Apr. 2011,
U.S. Provisional Patent Application 61/480,903, filed on 29 Apr. 2011,
U.S. Provisional Patent Application 61/480,912, filed on 29 Apr. 2011, and
U.S. Provisional Patent Application 61/480,944, filed on 29 Apr. 2011.

TECHNICAL FIELD

The present invention relates to the field of metallurgy. More specifically, the present invention relates to a method of heat-treating a titanium alloy, which may be used in the manufacture of a bearing component.

BACKGROUND

Bearings are devices that permit constrained relative motion between two parts. Rolling element bearings comprise inner and outer raceways and a plurality of rolling elements (balls or rollers) disposed therebetween. For long-term reliability and performance it is important that the various elements have a high resistance to rolling contact fatigue, wear and creep. The bearing components are typically manufactured from a bearing steel.

Titanium and its alloys exhibit a low density relative to many other structural metals and alloys, excellent corrosion resistance and high specific proof strengths (strength/density). At 885° C., pure titanium undergoes an allotrophic change from a hexagonal close packed structure to a body-centered cubic structure. Alloying elements are classified by whether they stabilise the $\alpha$ (low temperature, hcp) or $\beta$ (high temperature, bcc) crystal forms. $\alpha$-stabilisers, such as aluminium and tin, are typically added in order to increase the creep resistance of a titanium alloy. In contrast, $\beta$-stabilisers, such as vanadium, molybdenum and zirconium, are typically added to increase the strength.

The alloy known as VT22 comprises from 0.5 to 1.5 wt % Fe, from 0.5 to 2 wt % Cr, from 4 to 5.5 wt % Mo, from 4 to 5.5 wt % V, from 4.4 to 5.9 wt % Al, at most 0.1 wt % C, at most 0.15 wt % Si, at most 0.05 wt % N, at most 0.3 wt % Zr, at most 0.2 wt % O, at most 0.015 wt % H and the balance Ti together with unavoidable impurities.

Notwithstanding their advantageous properties, conventional titanium alloys, such as VT22, exhibit lower hardness, strength and impact toughness compared to bearing steel. Furthermore, titanium alloys have the tendency to gall even in the presence of good lubrication.

In order to overcome such a problem, wear-resistant coatings have been applied. In addition, in bearing applications, non-metallic counter faces have been used, such as silicon nitride balls coated with diamond-like carbon. However, there are currently no titanium alloys that exhibit sufficient resistance to surface fatigue and rolling contact fatigue such that they could be used in bearing components without having to use the above measures.

JP 11153140 describes a titanium alloy comprising from 1.0 to 5.0 wt % Cr and the balance Ti. After $\alpha'$ martensite quenching this alloy has high hardness and is used for manufacturing bearing rings. However, this alloy has a low thermal stability due to the presence of 80% metastable $\alpha'$-martensite, which is problematic since bearings often experience heating during use.

US 2004/0231756 describes a titanium alloy comprising from 3.2 to 4.2 wt % Al, from 1.7 to 2.3 wt % Sn, from 2.0 to 2.6 wt % Zr, from 2.9 to 3.5 wt % Cr, from 2.3 to 2.9 wt % Mo, from 2.0 to 2.6 wt % V, from 0.25 to 0.75 wt % Fe, from 0.01 to 0.08 Si, 0.21 wt % or less O, and the balance Ti. After heat treatment this alloy exhibits both high strength and high ductility. However, since the ductility is so high, the alloy is unable to withstand high contact stresses.

It is an objective of the present invention to address or at least mitigate some of the problems associated with prior art and to provide a method of heat-treating a titanium alloy which can be used in the manufacture of a bearing component.

SUMMARY

In a first aspect, the present invention provides a method for preparing a titanium alloy for a bearing component, the method comprising:
(i) providing an alloy composition comprising:
   from 5 to 7 wt % Al,
   from 3.5 to 6.0 wt % V,
   from 0.5 to 6.0 wt % Mo,
   from 0.2 to 4.5 wt % Fe,
   from 0.05 to 2.5 wt % Cr,
   optionally one or more of the following elements
      up to 2.5 wt % Zr,
      up to 2.5 wt % Sn,
      up to 0.5 wt % C, and
   the balance comprising Ti together with unavoidable impurities;
(ii) heating the alloy to a temperature T below the ($\alpha+\beta/\beta$)-transition temperature $T_\beta$ and then quenching; and
(iii) ageing the alloy at a temperature of from 400 to 600° C.

The resulting alloy exhibits high hardness and/or high resistance to rolling contact fatigue. This means that it can usefully find application in the manufacture of a bearing component, for example an inner or outer raceway.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Once heated to the temperature T the alloy composition is preferably worked before being quenched. The working is preferably carried out by rolling. The rolling may comprise multiple rolling stages with intermediate annealing stages. Such stages may help to provide the final alloy with the desired microstructure.

After the subsequent quenching and ageing steps, the alloy is provided with a generally homogeneous microstructure comprising $\beta$-phase grains in which are dispersed $\alpha$-phase precipitates, typically in the form of plates. Such a microstructure provides the alloy with the desired levels of hardness and/or resistance to rolling contact fatigue.

The temperature Tβ is the temperature at which the microstructure of the alloy changes from one comprising both the α-phase and β-phase to one that is essentially only the β-phase.

The alloy is heated to a temperature T below the (α+β/β)-transition temperature Tβ and then quenched. The temperature T below the (α+β/β)-transition temperature Tβ is preferably above the (α+α/β)-transition temperature Tα, i.e. above the temperature at which the microstructure changes from α-phase only to a microstructure comprising both α-phase and β-phase. Preferably the temperature T below the (α+β/β)-transition temperature Tβ is such that:

$$T_\beta > T \geq T_\beta - 50° \text{ C.},$$

preferably $T_\beta > T \geq T_\beta - 30° \text{ C.},$ more preferably $T_\beta - 10° \text{ C.} \geq T \geq T_\beta - 20° \text{ C.},$ still more preferably $T = \text{about } T_\beta - 15° \text{ C.}$ The temperature T is typically less than 1000° C., preferably from 800 to 950° C., more preferably from 820 to 900° C., more preferably from 835 to 860° C., still more preferably about 845° C. These values of temperature T provide the alloy with high hardness and/or resistance to rolling contact fatigue after ageing.

Quenching is preferably carried out in water, more preferably agitated water. Preferably the quenching is carried out at a rate of at least 20° C./s, more preferably at least 25° C./s, still more preferably at about 30° C./s. The cooling rate of such quenching is suitable for providing the quenched alloy with the desired microstructure.

Preferably the quenching is carried out down to a temperature lower than 200° C., more preferably to 60° C. or lower, still more preferably to about room temperature.

After quenching, the alloy preferably has a microstructure comprising from 5 to 30 vol % α-phase, more preferably form 5 to 20 vol % α-phase, preferably form 10 to 15 vol % α-phase. This provides the alloy with high hardness and/or resistance to rolling contact fatigue after ageing. The β-phase therefore typically makes up from 70 to 95 vol % of the microstructure, more typically from 80 to 95 vol %, still more typically from 85 to 90 vol %.

Ageing is carried out at a temperature of from 400 to 600° C. Preferably the ageing is carried out at a temperature of from 415 to 575° C., more preferably from 425 to 525° C. Ageing at these temperatures increases the hardness of the alloy.

Preferably ageing is carried out for up to 60 hours, more preferably up to 35 hours, more preferably up to 20 hours, still more preferably from 1 to 15 hours. This provides the alloy with increased hardness. Ageing for greater lengths of time is less cost effective and may also result in the alloy becoming brittle.

The ageing is preferably carried out in an inert atmosphere, more preferably argon or a vacuum. This avoids any undesired reactions of the alloy with the atmosphere, such as oxidation.

After ageing, the alloy may be cooled, preferably in an inert atmosphere, until it reaches a temperature of 200° C. or less. This avoids any undesired reaction of the aged alloy in air.

After ageing, the alloy may be cooled at a rate of at least 1° C./s, preferably from 2 to 10° C./s, more preferably at about 3° C./s. Such cooling helps to provide the desired microstructure.

In one embodiment, the alloy composition for use in the method according to the present invention comprises:
(a) from 5 to 7 wt % Al,
(b) from 3.5 to 4.5 wt % V,
(c) from 0.5 to 1.5 wt % Mo,
(d) from 2.5 to 4.5 wt % Fe,
(e) from 0.05 to 2 wt % Cr,
(f) optionally one or more of the following elements
up to 2.5 wt % Zr,
up to 2.5 wt % Sn,
up to 0.5 wt % C, and
(g) the balance comprising Ti together with unavoidable impurities.

The role of the alloying elements in all embodiments of the present invention will now be discussed.

The alloy comprises from 5 to 7 wt % Al, preferably from 5.5 to 6.7 wt % Al, more preferably from 6 to 6.5 wt % Al, still more preferably about 6.4 wt % Al. In combination with the other alloying elements, this provides the desired mechanical properties of the alloy, particularly strength. Higher levels of Al may lead to abrupt decreasing of the alloy's deformability. In addition, for higher Al levels, α2-phase (intermetallic compound Ti3Al) may be precipitated during heat treatment, which can result in embrittlement of the alloy.

The alloy comprises from 3.5 to 6.0 wt % V, preferably from 3.5 to 4.5 wt % V, more preferably from 3.7 to 4.3 wt % V, still more preferably from 3.8 to 4.1 wt % V. As a β-stabilising element (β-isomorphous stabiliser), V serves to obtain a single-phase β-condition in the alloy after quenching. In addition, V has good solubility not only in the β phase but also in the αphase. Furthermore, V does not decrease the plasticity of the alloy as strongly as other β-stabilising elements.

The alloy comprises from 0.5 to 6.0 wt % Mo, preferably from 0.5 to 1.5 wt % Mo, more preferably from 0.7 to 1.3 wt % Mo, more preferably from 0.9 to 1.2 wt % Mo, still more preferably about 1.1 wt % Mo. Mo in this amount serves to obtain a single-phase β-condition in the alloy after quenching and also increases the strength of the alloy.

The alloy comprises from 0.2 to 4.5 wt % Fe, preferably from 2.5 to 4.5 wt % Fe, more preferably from 3 to 4.3 wt % Fe, more preferably from 3.4 to 4.2 wt % Fe, still more preferably about 4.1 wt % Fe. As a β-eutectoid stabiliser, Fe provides solid solution strengthening. However, higher levels of Fe can reduce the fabricability of the alloy. In addition, higher levels of Fe may result in eutectoid decomposition of the β-phase with precipitation of intermetallic compound TiFe2 during heat treatment, which can result in alloy embrittlement.

The alloy comprises from 0.05 to 2.5 wt % Cr, preferably from 0.05 to 2 wt % Cr, more preferably from 0.06 to 1.5 wt % Cr, more preferably from 0.07 to 1.2 wt % Cr, still more preferably about 0.07 wt % Cr. As a β-eutectoid stabiliser, Cr provided a similar effect to Fe, albeit with the precipitation of TiCr2 at higher Cr levels.

The alloy optionally contains up to 2.5 wt % Zr. For example, the alloy may contain from 1 to 2.5 wt % Zr, preferably from 1.5 to 2.4 wt % Zr, more preferably from 1.7 to 2.2 wt % Zr, still more preferably about 2.4 wt % Zr.

The alloy optionally contains up to 2.5 wt % Sn. For example, the alloy may contain from 1.5 to 2.5 wt % Sn, preferably from 1.7 to 2.4 wt % Sn, more preferably from 1.9 to 2.3 wt % Sn, still more preferably about 2.5 wt % Sn.

Zr and Sn are substitution neutral alloying elements and their addition in the above amounts, when combined with the other alloying elements, results in solid solution strengthening of the alloy.

The alloy optionally contains up to 0.5 wt % C. For example, the alloy may contain from 0.01 to 0.5 wt % C, preferably from 0.015 to 0.35 wt % C, more preferably from 0.018 to 0.2 wt % C, still more preferably about 0.02 wt % C. As a strong α-phase stabiliser, the presence of C leads to significant α-phase strengthening due to the formation of interstitial solid solution. Higher levels of C reduce the ductility of the alloy.

The balance of the composition comprises Ti together with any unavoidable impurities.

In another embodiment, the alloy comprises:
(A) from 5.5 to 6.5 wt % Al,
(B) from 3.5 to 4.5 wt % V,
(C) from 0.5 to 1.5 wt % Mo,
(D) from 3.5 to 4.5 wt % Fe,
(E) from 0.05 to 2 wt % Cr,
(F) from 1.5 to 2.5 wt % Zr,
(G) from 1.5 to 2.5 wt % Sn,
(H) from 0.01 to 0.2 wt % C, and
(I) the balance comprising Ti together with unavoidable impurities.

The alloy composition of this embodiment preferably comprises about 6.4 wt % Al, about 4.1 wt % Fe, about 1.1 wt % Mo, about 4.3 wt % V, about 0.07 wt % Cr, about 2.5 wt % Sn, about 2.4 wt % Zr, about 0.02 wt % C, the balance comprising Ti together with unavoidable impurities. Such an alloy exhibits high hardness and/or resistance to rolling contact fatigue.

For this embodiment, T is preferably 845° C. (±2) and the alloy is aged at a temperature of 500° C. (±2) for from 25 to 35 hours. Such a heating regime helps to provide a desirable microstructure, which contributes towards the high hardness and/or rolling contact fatigue resistance of the alloy.

In yet another embodiment, the alloy composition comprises:
(a) from 5 to 7 wt % Al,
(b) from 3.5 to 6 wt % V,
(c) from 3 to 6 wt % Mo,
(d) from 0.2 to 2.5 wt % Fe,
(e) from 0.1 to 2.3 wt % Cr,
(f) optionally one or more of the following elements
   0 to 0.7 wt % Zr,
   0 to 0.7 wt % Sn,
   0 to 0.5 wt % C, and
(g) the balance comprising Ti together with unavoidable impurities.

In this embodiment, the alloy composition comprises: from 5 to 7 wt % Al, preferably from 4 to 6.5 wt % Al, more preferably from 4.4 to 5.9 wt % Al; from 3.5 to 6 wt % V, preferably from 3.8 to 5.7 wt % V, more preferably from 4 to 5.5 wt % V; from 3 to 6 wt % Mo, preferably from 3.5 to 5.8 wt % Mo, more preferably from 4 to 5.5 wt % Mo; from 0.1 to 2.3 wt % Fe, preferably from 0.3 to 2 wt % Fe, more preferably from 0.5 to 1.5 wt % Fe; from 0.1 to 2.3 Cr, preferably from 0.3 to 2.2 wt % Cr, more preferably from 0.5 to 2 wt % Cr.

In this embodiment, the alloy composition optionally comprises at most 0.7 Zr, preferably at most 0.5 % Zr, more preferably at most 0.3 % Zr. Similarly, the alloy composition optionally comprises at most 0.7 wt % Sn, preferably at most 0.5 wt % Sn, more preferably at most 0.3 wt % Sn. Similarly, the alloy composition optionally comprises at most 0.5 wt % C, preferably at most 0.2 wt % C, more preferably at most 0.1 wt % C.

In a preferred aspect of this embodiment the alloy composition comprise about 5.5 wt % Al, about 1.2 wt % Fe, about 4.6 wt % Mo, about 4.9 wt % V, about 1.1 wt % Cr, the balance comprising Ti together with unavoidable impurities.

In this embodiment, T is preferably 870° C. (±2) and the alloy is aged at a temperature of 450° C. (±2) for from 5 to 15 hours. Such a heating regime helps to provide a desirable microstructure, which contributes towards the high harness and/or rolling contact fatigue resistance of the alloy.

The chemical composition of the alloy for use in the present invention may be such that the molybdenum equivalent [Mo]eq is from 10 to 12. The molybdenum equivalent may be calculated by the following formula:

$$[Mo]_{eq}=[Mo]+0.2[Ta]+0.28[Nb]+0.4[W]+0.67[V]+1.25[Cr]+1.25[Ni]+1.7[Mn]+1.7[Co]+2.5[Fe]$$

[Mo]eq values of 10 or above increase the hardness of the alloy. If [Mo]eq is less than 10, martensite α" will be formed during quenching, and its further decomposition will not give the necessary increase in hardness. Higher values of [Mo]eq will result in a considerable increase in hardness during decomposition of β-phase. However, such an increase in hardness will only be provided after a long ageing time, typically from 50 to 100 hours. Furthermore, microchemical non-uniformity of the distribution of alloying elements is common for these β-alloys. Therefore, α-phase precipitation occurs in a non-uniform fashion throughout the volume, for example in one β-grain this process has already started and in a neighbouring one it has not. In that case, two neighbouring grains will have different levels of hardness.

It will be appreciated that the titanium alloys for use in the method according to the present invention may contain unavoidable impurities, although, in total, these are unlikely to exceed 0.5 wt. %. Preferably, the alloy contains unavoidable impurities in an amount of not more than 0.3 wt. %, more preferably not more than 0.1 wt. %.

The microstructure of the heat-treated alloy preferably comprises β-phase grains having precipitates of α-phase dispersed therein. The microstructure is preferably essentially homogeneous. The microstructure and resulting mechanical properties lead to high hardness and improved rolling contact fatigue performance in a bearing component formed of the alloy.

The heat-treated alloy preferably has a Rockwell hardness (ASTM E18-02) of at least 48 HRC, more preferably at least 50 HRC, even more preferably at least 52 HRC. Such hardness levels make the alloy particularly suitable for use in a bearing component.

The alloy may consist essentially of the recited elements. In addition to those elements that are mandatory, additional non-specified elements may be present in the alloy provided that the essential characteristics of the alloy are not materially affected by their presence.

In a second aspect, the present invention provides a method of manufacturing a bearing component, the method comprising:
(I) preparing a titanium alloy as herein described;
(II) machining the alloy into a desired shape of a bearing component.

A bearing comprising a bearing component formed by this method may be used in many different types of machinery to retain and support rotating components. Since the titanium alloys as herein described exhibit low density relative to other structural metals and alloys, excellent corrosion resistance and high specific proof strengths (strength/density), such bearings are particularly suited for use in machinery in which there is a desire to reduce the moving mass, for example racing cars and aeroplanes.

The machining is preferably carried out between the quenching and ageing steps. The ageing step increases the hardness of the alloy. Therefore, the alloy is more easily machined if the machining is carried out between the quenching and ageing steps.

After ageing, the bearing component is preferably machined to remove a layer not less than 30 µm in depth, more typically not less than 50 µm. For example, a layer from 50 µm to 100 µm in depth. This ensures that the outer layer enriched with oxygen (and therefore having higher brittleness) is removed. Titanium alloys have a high susceptibility to oxidation, which is increased by having a high β-phase volume fraction. Since the alloys are pseudo-β titanium alloys having more than 50% β-phase after annealing, the oxygen enriched outer layer of these alloys is typically up to 50 µm thick.

The bearing component can be at least one of a rolling element (for example a ball or roller element), an inner ring, and an outer ring. The bearing component could also be part of a linear bearing such as ball and roller screws. The titanium alloy as herein described is particularly suitable for forming an inner ring and/or an outer ring of a bearing.

BRIEF DESCRIPTION OF THE FIGURES

The invention will now be discussed further with reference to the figures, provided purely by way of example, in which.

EXAMPLES

The invention will now be described further, by way of example, with reference to the following non-limiting examples.

Example 1

Preparation of Ingots:

A 20 kg ingot having the chemical composition Ti-6.4Al-4.1Fe-1.1Mo-4.3V-2.5Sn-2.4Zr was prepared in a vacuum arc furnace with consumable electrode by double remelting. Titanium sponge TG-120 was used to make the electrode. Due to its high melting point, Mo was introduced into the alloy via the ligature AMBTi (32% V-36.8% Mo-14% Al-0.39% Fe-0.23% Si), rather than in pure form which may lead to the formation of inclusions. V, Fe and Al were partly introduced via ligature and partly in pure form. Zr and Sn were introduced into the alloy in pure form only. Titanium sponge was mixed with ligature and pure elements, which were in the form of small metal pieces or turnings. The resultant mixture was pressed into a matrix using a 2000-ton press. The pressed electrode was melted in a copper crystallizer with diameter Ø125 mm and as a result the ingot of the first remelt was obtained. This ingot was then remelted for the second time in a crystallizer with diameter Ø150 mm at current intensity 2000 A, electric voltage 30V and vacuum level $5 \times 10^{-2}$ millimeters of mercury (6.7 Pa). Chemical analysis certified by TUV has shown that the chemical composition of the alloy corresponds to that of Ti-6.4Al-4.1Fe-1.1Mo-4.3V-2.5Sn-2.4Zr. After a second remelting the ingot was subjected to machining, which involved turning along the cylindrical surface and removal of shrinkage voids. The final ingot size after machining was Ø140 mm×250 mm.

Figure 1:
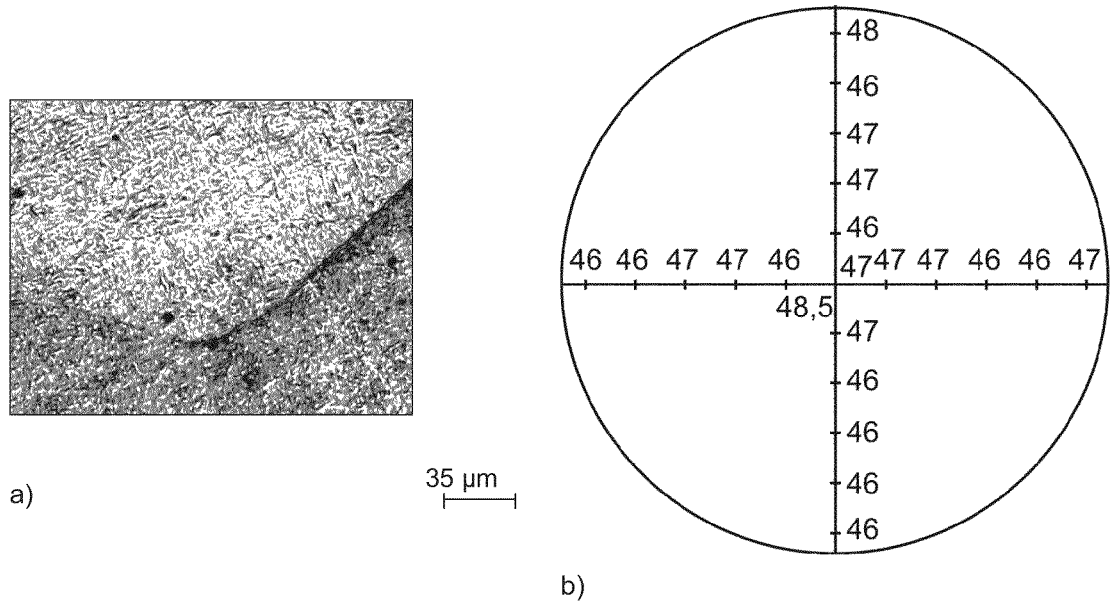
FIG. 1 shows a micrograph (FIG. 1a) and a hardness distribution (FIG. 1b) along a section of a Ti-6.4Al-4.1Fe-1.1Mo-4.3V-2.5Sn-2.4Zr alloy formed into a Ø47 mm rod after rolling in the β-range.

Preparation of Rods:

In the next stage, the ingot was rolled on a screw-shaped rolling press at a temperature of about 1050° C. (corresponding to the β-range) from a diameter of 140 mm to a diameter of Ø55 mm in one gate, and then machined to a diameter of Ø47 mm for the removal of cinder and α-modified layers. The rod's microstructure after rolling in the β-range was homogeneous and presented by large initial β-grains of about 500-800 microns size. Dispersed within the β-grains were α-phase plates precipitated during cooling from rolling to room temperature (see FIG. 1a). Hardness values were observed along all sections of the rod and were all within the range about 46-47 HRC, thus demonstrating the homogeneity of the microstructure (see FIG. 1b).

Figure 2:
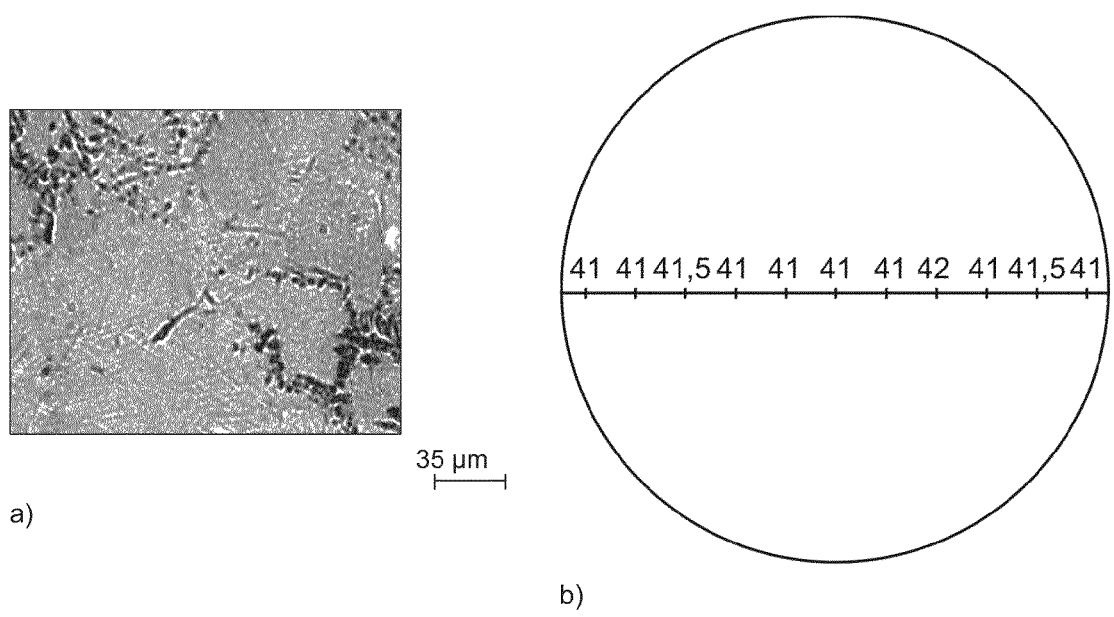
FIG. 2 shows a micrograph (FIG. 2a) and a hardness distribution (FIG. 2b) along a section of a Ti-6.4Al-4.1Fe-1.1Mo-4.3V-2.5Sn-2.4Zr alloy formed into a Ø22 mm rod after rolling in the (α+β)-range.

Subsequent stages of rolling for obtaining rods with diameter 20 mm were conducted in the (α+β)-range at a temperature of about 850° C. in three operations with intermediate annealing at 850° C. for 10 minutes. Dynamic recrystallisation took place during rolling leading to a decrease of the initial β-grain size to about 50-70 microns. In addition, rolling in the (α+β)-range caused α-phase precipitation during the deformation process as well as during the subsequent cooling to room temperature (see FIG. 2a). The hardness distribution along the rod section was homogeneous (see FIG. 2b). This hardness is a little lower than that of the rod of diameter Ø47 mm. This is explained by the fact that the cooling after screw-type rolling is carried out in a water-cooling pallet, while after lengthwise rolling it is carried out in air. This means that the cooling rate after screw-type rolling is higher and, therefore, α-phase precipitates are more dispersive. At the same time it is well known that the more dispersive microstructure leads to increased hardness.

Figure 3:
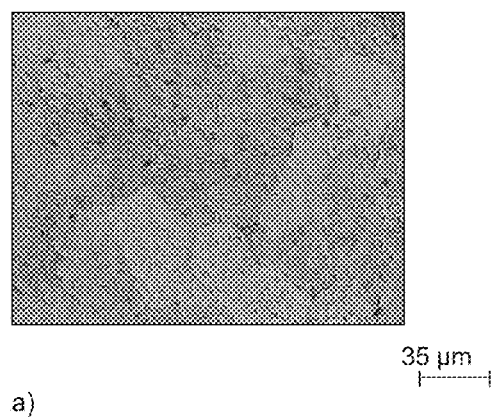
FIG. 3 shows a micrograph (FIG. 3a) and a hardness distribution (FIG. 3b) along a section of a Ti-6.4Al-4.1Fe-1.1Mo-4.3V-2.5Sn-2.4Zr alloy formed into a Ø14 mm rod after rolling in the (α+β)-range.
Figure 3:
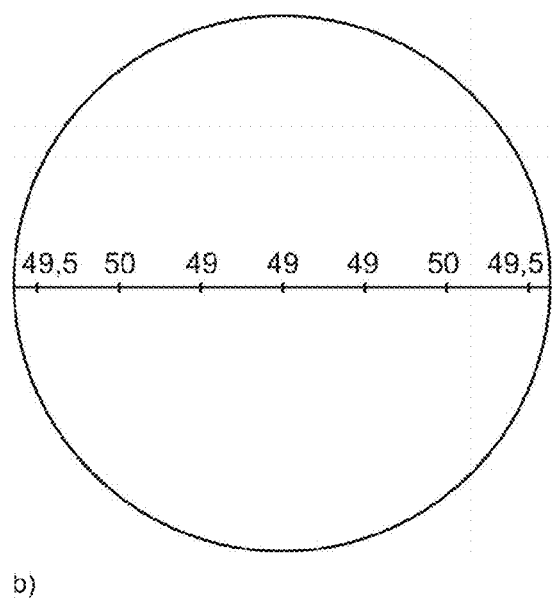
Figure 4:
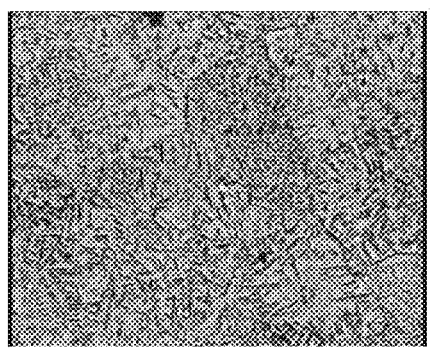
FIG. 4 shows micrographs of samples cut from Ti-6.4Al-4.1Fe-1.1Mo-4.3V-2.5Sn-2.4Zr alloy rods with Ø20 mm (a, b) and 14 mm (c, d) after quenching from 850° C.
Figure 4:
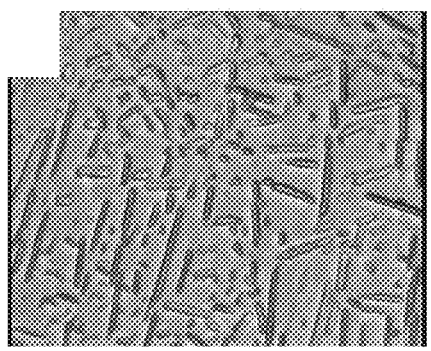
Figure 4:
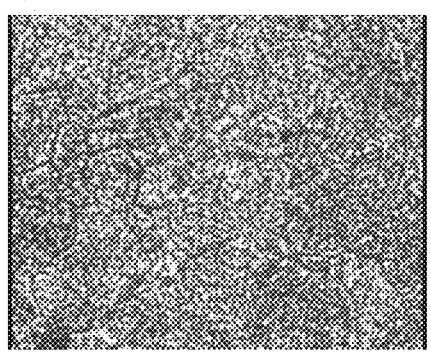
Figure 4:
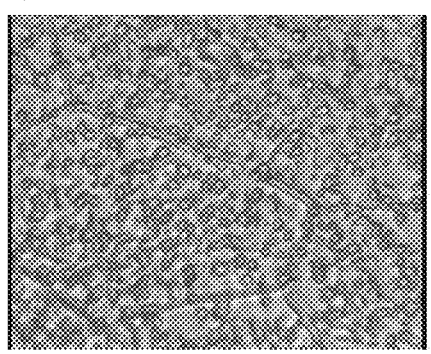

Part of the rods with diameter Ø22 mm were then used for sample production (herein Rolf Samples). For the production of another set of samples (herein Polymet Samples), rods with a diameter of Ø20 mm were then rolled to Ø14 mm in one gate on a screw-shaped rolling mill also at a temperature of about 850° C. Additional deformation and dynamic recrystallisation processes lead to a reduction of the initial β-grain size to about 28-45 microns (see FIG. 3a). At the same time cooling at a faster rate after rolling resulted in increased hardness in comparison to the rod Ø20 mm (see FIG. 3b).

quenched in water in temperature intervals of about 20° C. between about 800-960° C. With the use of metallographic and X-ray analysis it was shown that for the alloy investigated the polymorphic transformation temperature Tβ was equal to about 880° C. Therefore, the quenching temperature was chosen to be about 850° C. After quenching, samples cut from rods Ø14 mm and 20 mm have practically identical microstructures consisting of small amounts of α-phase and β-phase (see FIG. 4). The hardness of these rods also was similar and equal to about 36-37 HRC.

In samples with diameter Ø14 mm, the primary α-phase has a predominantly globular shape (see FIGS. 4c, d), while in ones with diameter Ø20 mm the primary α-phase has a predominantly lamellar shape (see FIGS. 4a, b). The difference in primary α-phase morphology is explained by the difference in the degree of deformation during the manufacturing of the semiproducts. However, investigations have shown that this difference does not have significant effect on the subsequent strengthening.

Next, ageing of samples was carried out at temperatures of about 500° C. and about 530° C. for various lengths of time. The results are set out in Table 1.

TABLE 1

Hardness of samples of Ti—6.4Al—4.1Fe—1.1Mo—4.3V—2.5Sn—2.4Zr alloy after ageing at 530° C. and 500° C. for various lengths of time

| Diameter (mm) | Hardness after quenching (HRC) | Ageing T (° C.) | Duration, hour | | | | | | | |
|---|---|---|---|---|---|---|---|---|---|---|
| | | | 1 | 2 | 6 | 8 | 10 | 14 | 18 | 20 |
| 20 | 36 | 500 | 50-50.5 | 49-50 | 51-51.5 | 51 | 51 | 51.5 | 51 | 51-51.5 |
| | | 530 | 51 | 51 | 50-51 | 51-51.5 | 51-51.5 | 51 | 50.5-51 | 50.5-51 |
| 14 | 37 | 500 | 51.5-52 | 51-52 | 52-52.5 | 52 | 52-53 | 53 | 52.5-53 | 52.5-53.5 |
| | | 530 | 51.5-52 | 51-51.5 | 51-52 | 51 | 51-51.5 | 51 | 51 | 51 |

Heat Treatment:

The starting semiproducts, especially the rod with diameter Ø14 mm, exhibited high hardness values. Accordingly, an attempt was made to obtain the desired hardness level (preferably ≥52 HRC) by ageing the hot-rolled semiproducts without intermediate quenching. However a significant increase in hardness was not observed. The hardness of the Ø14 mm rod increased on average by 1 unit, while that of the Ø20 mm rod increased on average by about 5-6 HRC units. However, the increase in hardness was not sufficient.

Accordingly, it is clear that in order for high levels of hardness to be obtained, a quenching step is desirable before ageing. Previous investigations conducted on trial samples have shown that the quenching temperature should correspond to an upper interval of the (α+β)-range. However, the higher the quenching temperature in the (α+β)-range, the less alloyed the β-phase is and the higher the strengthening increase that can be obtained by the subsequent ageing. In spite of the fact that minimal degree of β-phase alloying is achieved on quenching from the β-range, such a high temperature causes the complete removal of deformation strengthening, which is also a very important component of the final strengthening. Therefore, quenching from the β-range and subsequent ageing led to a smaller strengthening effect in comparison to a heat treatment consisting of quenching from the (α+β)-range and ageing.

The polymorphic transformation temperature Tβ, the temperature of the (α+β)/β-transition, was determined for the new alloy using a trial quenching method. Samples were The ageing temperature determines the diffusive mobility of the alloying element atoms, as well as the rate of nucleation and growth of secondary α-phase particles. The higher the ageing temperature the higher the diffusive mobility of the atoms and, therefore, the more rapidly the precipitation process begins and finishes. At the same time, at higher temperatures, growth rate predominates over nucleation rate and therefore the precipitated α-phase particles will be larger. Consequently, the level of strengthening will be lower.

For rods with a diameter of Ø20 mm the precipitation process at about 530° C. is complete after about 8-10 hours (see Table 1), but the required hardness is not achieved. When ageing at about 500° C. the precipitation process is complete after 18 hours. It is noted that the lowest required hardness level is obtained on the Ø14 mm rod.

In order to achieve a hardness higher than about 52 HRC, the ageing temperature was decreased to about 475° C. While this required an ageing time of about 25-27 hours, a hardness of about 53-54 HRC was obtained (see Table 2).

Figure 5:
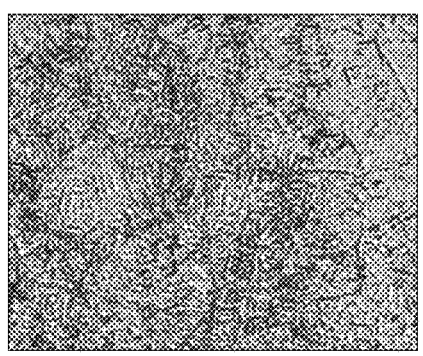
FIG. 5 shows micrographs of samples Ø20 (a) and 14 (b) mm from Ti-6.4Al-4.1Fe-1.1Mo-4.3V-2.5Sn-2.4Zr alloy after quenching from 850° C. and ageing at 475° C. for 25 hours.
Figure 5:
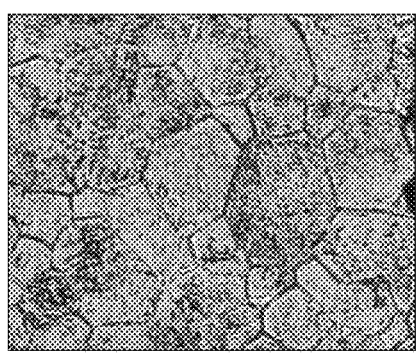

As shown in FIG. 5, the microstructures of samples cut from rods with diameter Ø14 and 20 mm after ageing are practically the same. The photographs clearly show initial β-grains decorated by α-phase precipitates. Secondary α-phase precipitation during the ageing process is very dispersive and revealed metallographically only as a grey background in the β-matrix.

TABLE 2

Hardness of samples of Ti—6.4Al—4.1Fe—1.1Mo—4.3V—2.5Sn—2.4Zr alloy
after ageing at 475° C. for various lengths of time

| Diameter (mm) | Hardness after quenching (HRC) | Duration, hour | | | | | | | | |
|---|---|---|---|---|---|---|---|---|---|---|
| | | 1 | 3 | 6 | 10 | 14 | 20 | 25 | 30 | 40 |
| 20 | 36 | 50.5-51 | 51-51.5 | 51-52 | 50-51 | 52-53 | 52.5-53 | 53-53.5 | 53 | 53-53.5 |
| 14 | 37 | 51 | 52-52.5 | 52-53 | 53-53.5 | 53-53.5 | 53.5 | 53.5-54 | 53.5-54 | 53.5 |

Preparation of Samples:

Intermediates were cut from the 20 and 14 mm rods, and were then heated to a temperature of about 850° C. in an air furnace and then quenched. Once quenched, the samples had a low hardness and, therefore, it was easer to machine them. Accordingly, after quenching, samples were machined to remove of 0.30 mm per side. The machined semiproducts were subjected to ageing. In order to check the level of harness during the ageing a control sample was put with each sample batch. The control samples had a hardness of about 53-54 HRC. The samples were then subjected to final machining.

Testing of Resistance to Rolling Contact Fatigue (RCF):

Twenty sets of inner and outer rings of bearings were produced and heat treated. All rings exhibited a hardness value of about 52-53 HRC, with a narrow standard deviation. The dimensions of the bearings were as follows:

Bearing name: SKF 6309 bearing 6309 size
Brand: SKF
Outer diameter D (mm): 100
Diameter d (mm): 45
Thickness B (mm): 25

No coatings were applied to the rings. The rings were assembled into bearings with a polymer L-shaped cage and ceramic balls. The rolling contact fatigue characteristics of the bearings were investigated under the following conditions:

Test rig: TLE G19.08 (R2)
Load measuring device: TLE G19.20
Bearing axis: horizontal
Lubrication: Shell Spirax 80W90 oil bath at ambient temperature
Radial load: 700 daN (C/P=8) on fixed outer ring
Inner ring speed: 3450 rpm (n.dm=250.000)
Test duration: 1.5 million rev
Contact stress: 2.4 GPa The test was able to be carried out for 123.6 hours and 25585200 revolutions without failure. Accordingly, it is clear that the rings exhibited the required mechanical stability (and surface stability since the rings were not coated) to be able to hold the stresses without plastic collapse. No known Ti alloys are capable of surviving such a stress level. The testing load is representative of loads used for testing high strength bearing steels. For safety, many industrial applications, such as windmills, require stress levels to be maintained below 2 GPa. Although the test cannot be considered as a life test, it gives a good indication of the alloy characteristics achieved by the combination of the heat treatment and alloy composition.

Results of further tests of the rolling contact fatigue characteristics of the rings are set out in Table 3 below.

TABLE 3

Results of rolling contact fatigue tests on samples of alloy
Ti—6.4Al—4.1Fe—1.1Mo—4.3V—0.07Cr—2.5Sn—2.4Zr—0.02C

| Rider | Test Temperature (° C.) | Stress (GPa) | Stress cycles | Track dimensions | | Comments |
|---|---|---|---|---|---|---|
| | | | | Width (mm) | Depth (gm) | |
| Hardened Steel Discs AISI 52100 at 62 HRc (Polymet Samples) | 20 | 2.5 | 5 × 10$^7$ | 0.65 | Not measured | Suspended |
| | | 2.8 | 5 × 10$^7$ | 0.70 | Not measured | Suspended |
| | | 3.2 | 5 × 10$^7$ | 0.78 | Not measured | Suspended |
| | | 4.0 | 5 × 10$^7$ | 0.82 | Not measured | Suspended |
| | | 4.5 | 1.8 × 10$^7$ | 0.91 | ≤0.2 | Spalled |
| | | 5.0 | 4.5 × 10$^7$ | 0.98 | 2.5 | Spalled |
| Si$_3$N$_4$ balls (Rolf Samples) | 75 | 1.5 | 1.3 × 10$^8$ | | Not measured | Suspended |
| | | 2.1 | 1.3 × 10$^8$ | | Not measured | Suspended |
| | | 3.0 | 1.3 × 10$^8$ | | Not measured | Suspended |
| | | 4.0 | 1.3 × 10$^8$ | | Not measured | Suspended |
| | | 4.5 | 5 × 10$^7$ | | ≤0.15 | Spalled |

Any "suspended" test is a successful one, i.e. it is suspended without failure or spalling. The Polymet Samples feature a longer bar than the Rolf Samples. Also, instead of being in contact with ceramic balls (Rolf Samples), the Polymet Samples are in contact with two rotating discs of hardened steel (AISI 52100 at 62 HRc). As a consequence, the Rolf Samples are characterised by a point contact, whereas the Polymet samples are characterised by a line contact. In every turn, the Rolf Samples make 3 loading cycles, whereas the Polymet Samples make 2.

Example 2

200 g Ingots having the following compositions were smelted in a laboratory vacuum arc furnace with a non-consumable tungsten electrode by fivefold remelting:

Ti-6Al-4V-1Mo-1Cr-3.5Fe
Ti-6Al-2V-0.5Mo-2.5Cr-3.5Fe
Ti-6Al-2V-0.5Mo-1Cr-5.5Fe
Ti-6Al-4V-1Mo-1Cr-3.5Fe-2Sn-2Zr
Ti-6Al-4V-1Mo-1Cr-3.5Fe 2Sn-2Zr-0.15C
Ti-6Al-4V-1Mo-1Cr-3.5Fe2Sn-2Zr-0.3C
Ti-6Al-4V-1Mo-1Cr-3.5Fe2Sn-2Zr-0.5C

The resulting ingots had a height of approximately 14 mm and a diameter of approximately 40 mm. Visual inspection of the ingots and analysis of their microstructures allowed selection of three alloy compositions for further investigation. Structures of alloys containing more than 4.5% β-eutectoid stabilizers had a large microchemical heterogeneity, which was difficult to eliminate by homogenization annealing. This phenomenon is very widespread for alloys containing a large quantity of β-eutectoid stabilisers (therefore their typical content does not exceed 4.4-5% in β-titanium alloys). It was not possible to eliminate microchemical heterogeneity under fivefold remelting. For alloys containing 0.3% and 0.5 wt % C, cracks were observed appearing on the ingots after their cooling to room temperature. This is presumably connected with the emergence of greater tensile stress due to formation of α-interstitial solid solution and carbides, since carbon has low solubility in the β-phase, the volume fraction of which is more than 80% after cooling.

Figure 6:
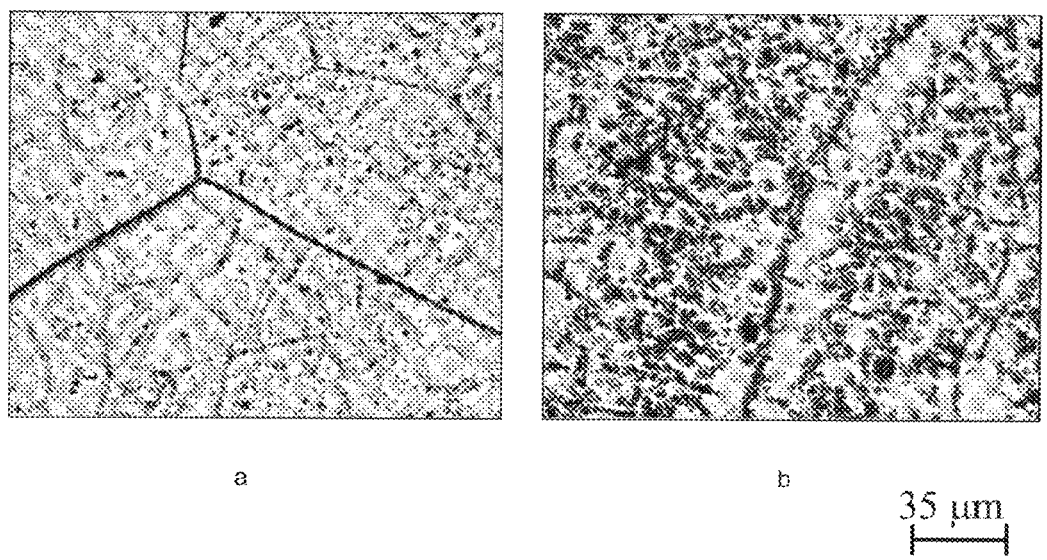
FIG. 6 shows micrographs of Ti-6Al-4V-1Mo-1Cr-3.5Fe-2Sn-2Zr (a) and Ti-6Al-4V-1Mo-1Cr-3.5Fe-2Sn-2Zr-0.15C (b) after casting.

Therefore, three compositions of Ti alloys were chosen for further investigation:

Alloy 1: Ti-6Al-4V-1Mo-1Cr-3.5Fe (basic alloy)
Alloy 2: Ti-6Al-4V-1Mo-1Cr-3.5Fe-2Sn-2Zr
Alloy 3: Ti-6Al-4V-1Mo-1Cr-3.5Fe-2Sn-2Zr-0.15C The cast structure of these alloys is uniform and characterized by large β-grains and fine particles of α-phase precipitating from the β-phase during cooling of the ingots to room temperature (FIG. 6).

The amount of α-phase precipitation depends on the chemical composition of an alloy. A rather large amount of α-phase is precipitated in the Ti-6Al-4V-1Mo-1Cr-3.5Fe alloy (not shown). The addition of Sn and Zr (Alloy 2) results in stabilisation of the β-phase and reduction of the critical cooling rate (rate under cooling with which the diffusion of component atoms is suppressed). Accordingly, there is a negligible amount of separate α-phase particles in the structure (FIG. 6a). Carbon is an α-stabilizer, i.e. it increases the temperature of the β→α polymorphic transformation and increases the critical cooling rate. Therefore, there is a large amount of α-phase in the structure and its size is bigger than in the basic alloy because α-phase precipitation begins to occur at higher temperatures (FIG. 6b). Some indication of alpha-depleted zones around the grain boundaries is also observed.

The difference in hardness of cast alloys mainly depends on the amount of precipitated α-phase and the degree of its dispersion. Results of hardness measurements are given in Table 4.

TABLE 4

Hardness of pilot titanium cast alloy

| Alloy chemical composition | | HRC |
|---|---|---|
| Alloy 1 | Ti—6Al—4V—1Mo—1Cr—3.5Fe | 48 |
| Alloy 2 | Ti—6Al—4V—1Mo—1Cr—3.5Fe—2Sn—2Zr | 35.5 |
| Alloy 3 | Ti—6Al—4V—1Mo—1Cr—3.5Fe—2Sn—2Zr—0.15C | 41.5 |

Alloy 2 has a minimal hardness because in this case the hardness is caused by solid solution strengthening of the β-phase. For Alloys 1 and 3, the higher values of hardness are caused by precipitated α-phase particles. In Alloy 1, smaller particles give higher hardness. Ingots of the three chosen compositions were divided in half and were then forged at about 900° C. On average the initial blanks were approximately 20×14 mm in cross-section. They were then deformed to obtain a square cross section. The final size of samples with approximate section 12×11 mm and length 100 mm were obtained by forging in the longitudinal direction. The reduction ratio was about 2, which is determined as a ratio of the cross sectional area before and after deformation. This indicates than during forging the materials was deformed to only a small degree.

The obtained 100 mm billets were cut up into samples with heights of 1 to 15 mm for conducting structure studies in the initial state and after extra thermal treatment, and also hardness measurements.

Figure 7:
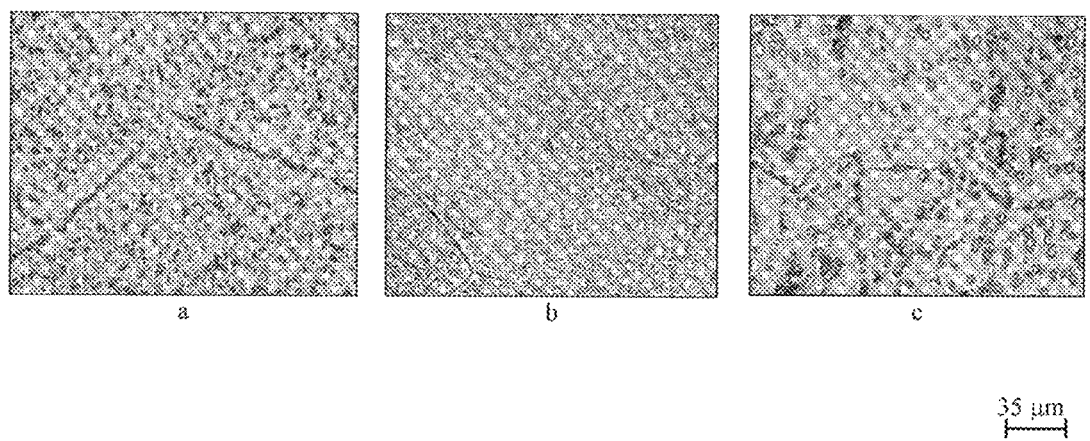
FIG. 7 shows micrographs of samples of Ti-6Al-4V-1Mo-1Cr-3.5Fe (a), Ti-6Al-4V-1Mo-1Cr-3.5Fe-2Sn-2Zr (b) and Ti-6Al-4V-1Mo-1Cr-3.5Fe-2Sn-2Zr-0.15C (c) after forging.

Microstructures of Alloys 1, 2 and 3 after forging are represented in FIG. 7. It can be seen that, in particular for Alloys 1 and 3, the deformation degree during forging was small and that in the two-phase (α+β)-area the sample structure was similar to the structure of the cast alloys (see, for example, FIGS. 6b and 7c for Alloy 3). The main difference concerns alloy 2. In the cast state, it has almost only β-phase in the structure (FIG. 6a), whereas after forging its structure changes (FIG. 7b) and becomes similar to the structure of Alloy 1 (FIG. 7a). However, because of additional alloying by Zr and Sn, which reduces the critical cooling rate, Alloy 2 is characterized by more disperse precipitations of α-phase after forging (FIG. 7b).

Since the material was subjected to small deformation during the forging process and since the temperature was rather high, relaxation processes had time to run. Therefore there is a hardness decrease in the Alloy 1 after forging (see Table 2). For the Alloy 2, there is a hardness increase, due to precipitation of disperse α-phase particles. There are almost no changes of hardness in the Alloy 3.

TABLE 5

Hardness of pilot titanium alloys after forging at 900° C.

| Alloy chemical composition | | HRC |
|---|---|---|
| Alloy 1 | Ti—6Al—4V—1Mo—1Cr—3.5Fe | 40.0 |
| Alloy 2 | Ti—6Al—4V—1Mo—1Cr—3.5Fe—2Sn—2Zr | 40.0 |
| Alloy 3 | Ti—6Al—4V—1Mo—1Cr—3.5Fe—2Sn—2Zr—0.15C | 42.0 |

The temperatures of the α+β/β transformation (Tβ) for each of Alloys 1, 2 and 3 were determined using test quenches. For Alloy 1, it was about 940° C., for Alloy 2 it was about 900° C., and for Alloy 3 it was about 1000° C. A part of each sample was quenched from the β-area, and a part was quenched from the (α+β)-area from temperatures about 50° below Tβ, namely about 890°, 850° and 950° C. for Alloys 1, 2 and 3, respectively.

Figure 8:
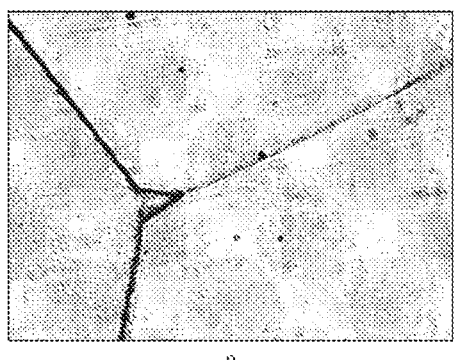
FIG. 8 shows micrographs of Ti-6Al-4V-1Mo-1Cr-3.5Fe after quenching from the β-area (a), and Ti-6Al-4V-1Mo-1Cr-3.5Fe, Ti-6Al-4V-1Mo-1Cr-3.5Fe-2Sn-2Zr and Ti-6Al-4V-1Mo-1Cr-3.5Fe-2Sn-2Zr-0.15C after quenching from the (α+β)-area (b, c, d, respectively).
Figure 8:
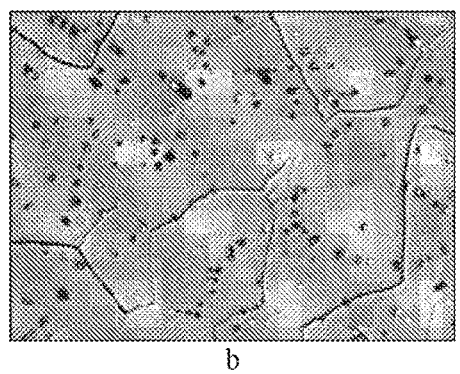
Figure 8:
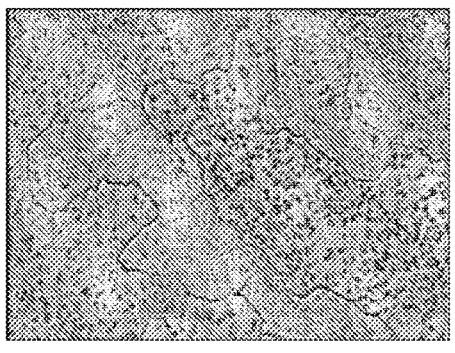
Figure 8:
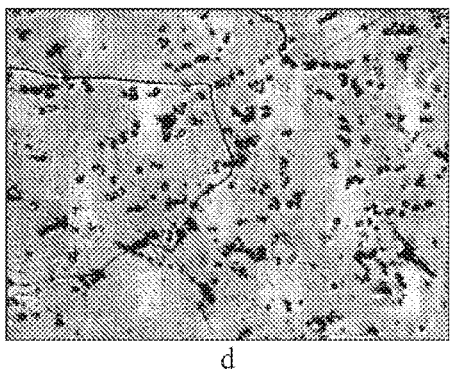

All alloys quenched from the β-area had the same structure consisting of β-grains (FIG. 8a), and after quenching from the (α+β)-area the structure was almost the same as in the state after forging (FIG. 8).

The hardness of alloys after quenching depends on the heating temperature. After quenching from the β-area, hardness is minimal and it is determined only by the alloying level of the solid solution, which is increased from Alloy 1 to Alloy 3 (see Table 6). After quenching from the (α+β)-area, hardness is also determined by the degree of dispersion of primary α-phase particles.

TABLE 6

Hardness of pilot titanium alloys after quenching in β- and (α + β)-areas

| | | HRC | |
|---|---|---|---|
| | Alloy chemical composition | of β-area | of (α + β)-area |
| Alloy 1 | Ti—6Al—4V—1Mo—1Cr—3.5Fe | 29.0 | 32.5 |
| Alloy 2 | Ti—6Al—4V—1Mo—1Cr—3.5Fe—2Sn—2Zr | 34.0 | 38.0 |
| Alloy 3 | Ti—6Al—4V—1Mo—1Cr—3.5Fe—2Sn—2Zr—0.15C | 35.0 | 36.5 |

Since the cooling rate under quenching is faster than the cooling rate after forging, the alloying level of β-phase will be different: the higher the heating temperature and cooling rate, the lower the alloying level of β-phase will be and all of the conditions being equal, the effect of strengthening should be greater.

The alloying level of β-phase could be estimated by the change of its lattice parameter calculated from X-ray analysis data. Values of aβ are given in Table 7.

TABLE 7

Change of lattice spacing β-phase ($a_β$) in different states

| | $a_β$, nm | | |
|---|---|---|---|
| State | Alloy 1 | Alloy 2 | Alloy 3 |
| After forging | 0.3221 | 0.3232 | 0.3236 |
| After quenching from β-area | 0.3238 | 0.3240 | 0.3250 |
| After quenching from (α + β)-area | 0.3235 | 0.3237 | 0.3247 |

It can be seen from the data presented in the Table 7 that a minimum alloying level of β-phase corresponds to quenching from the β-area, and maximum alloying levels correspond to the state after forging. Based on the alloying level of β-phase for the same alloy, one can indirectly estimate the amount of α-phase in the structure. The smaller the aβ lattice parameter, the more α-phase in the structure. In other words, there is more α-phase in the forging state in the structure, which is a reason for the higher values of hardness (see Tables 5 and 6). Of course, higher hardness after forging is also caused by deformation strengthening. But as deformation during forging is not large, it is precipitation of α-phase during deformation and cooling that is thought to make the main contribution to strengthening.

Next, samples from alloys 1, 2 and 3 were aged at a temperature of about 500° C. for different lengths of time in three states: after forging, quenching from β- and (α+β)-areas. The results of are given in the Table 8. As can be see from the data in Table 8, quenching from the β-area results in less strengthening. However, ageing after quenching from the (α+β)-area and immediately after forging provide similar results. In all cases, maximum strengthening was obtained after isothermal exposure for about 6 hours.

Figure 9:
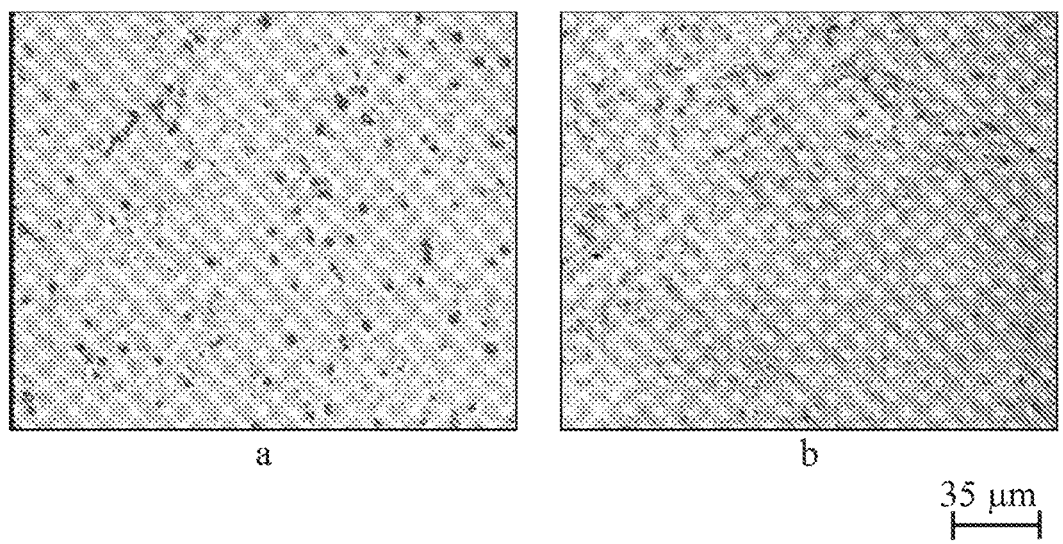
FIG. 9 shows micrographs of Ti-6Al-4V-1Mo-1Cr-3.5Fe (a) and Ti-6Al-4V-1Mo-1Cr-3.5Fe-2Sn-2Zr (b) after ageing at 500° C. for 6 hours.

Samples of Alloys 1 and 2 were quenched from the (α+β)-area and aged at about 500° C. for about 6 hours. The structure of these samples is represented in FIGS. 9(a, b). Samples of Alloys 1 and 2 have hardnesses of about 52-52.5 HRC. It should be noted that all hardness measurements were carried out on a Vickers hardness testing machine with a load of 30 kg, and were then converted into units of HRC in a conventional manner. Hardness is connected with precipitation of very dispersed α-phase, which provides a grey background in the microstructure images (FIG. 9). Dispersed precipitations not only increase material hardness but they also create a high level of stresses. Measuring the hardness of such samples using a diamond cone with a load of 150 kg caused destruction. An ageing temperature of about 450° C. was also studied. However, forming the structure created very high stress levels in the material, and the appearance of microcracks were observed under hardness measurements, even with a load of 5 kg. Therefore further studies of aged samples at this temperature were not carried out.

TABLE 8

Hardness of pilot titanium alloys after ageing at about 500° C. for different periods of time

| | | HRC | | | | | | | | | |
|---|---|---|---|---|---|---|---|---|---|---|---|
| State | Alloy | 1 h | 1.5 h | 2 h | 3 h | 4 h | 5 h | 6 h | 7 h | 8 h | 9 h | 10 h |
| After Forging | 1 | 49.5 | 50 | 50 | 51 | 51 | 52 | 52 | 52 | 50 | 50 | 51 |
| | 2 | 51 | 51 | 51 | 52 | 51 | 52 | 53 | 52.5 | 52.5 | 52 | 52 |
| | 3 | 51.5 | 51.5 | 52 | 52 | 52.2 | 52.5 | 53.7 | 52.5 | 52 | 52 | 52 |
| After quenching from β-area | 1 | 50 | 50.5 | 50.5 | 51 | 51 | 51 | 51 | 51 | 50 | 50 | 49 |
| | 2 | 50 | 50 | 50.5 | 51 | 51 | 51.5 | 51.5 | 51 | 51 | 51 | 51 |
| | 3 | 50.5 | 50.5 | 50.5 | 51 | 51 | 51.5 | 51.5 | 51.5 | 51 | 50.5 | 51 |
| After quenching from α + β)-area | 1 | 49.5 | 50 | 50 | 51 | 51.5 | 52.5 | 52.5 | 52.5 | 52 | 52 | 52 |
| | 2 | 50 | 50 | 51 | 51.5 | 52 | 52.5 | 53 | 53 | 52.5 | 52.5 | 52 |
| | 3 | 51 | 51 | 52 | 52 | 52.5 | 53 | 53.5 | 53.5 | 53 | 52 | 52 |

Example 3

Forged semiproducts were prepared having the composition set out in Table 9 below. The Forged semiproducts were cut into billets of approximate 120×12×40 mm size. A number of billets were cut into small samples of approximate 15×15×20 mm size for further investigation.

TABLE 9

Chemical composition of semiproducts

| Element | Al | V | Mo | Fe | Cr | Zr | Sn | C | $N_2$ | $O_2$ |
|---|---|---|---|---|---|---|---|---|---|---|
| wt % | 6.5 | 3.8 | 1.1 | 3.0 | 0.8 | 1.9 | 2.2 | 0.02 | 0.03 | 0.14 |

Figure 10:
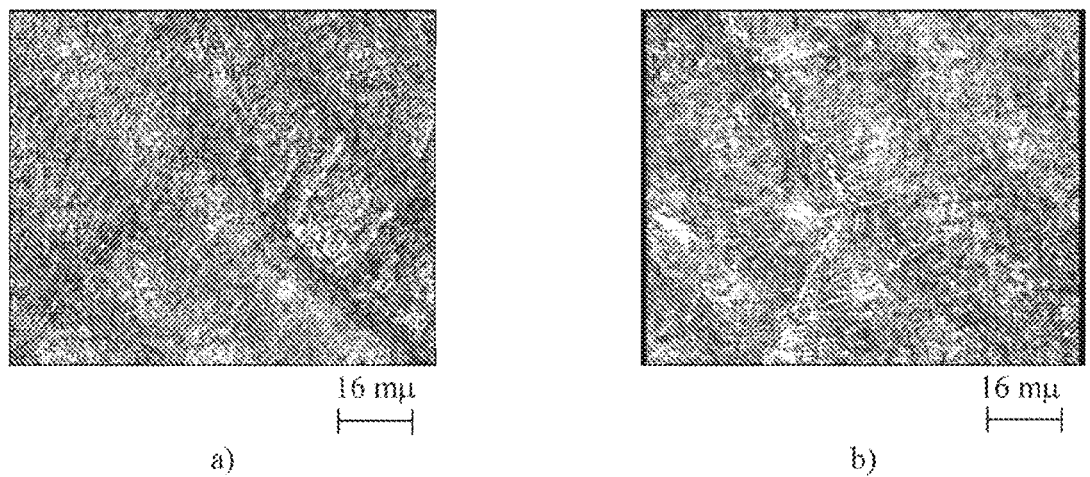
FIG. 10 shows micrographs of Ti-6Al-4V-1Mo-3.5Fe-1Cr-2Zr-2Sn alloy samples after hot rolling (a) and after additional ageing at 500° C. for 30 hours (b).

The microstructure of the semiproduct after hot rolling was investigated (see FIG. 10a). This microstructure comprises large initial β-grains with dispersive α-phase particles formed during hot deformation and subsequent cooling to room temperature.

The hot-rolled semiproduct had a relatively high hardness of about 43-44 HRC. Following low-temperature ageing the hardness only increased up to about 47 HRC (see FIG. 10b), in spite of the fact that plastic deformation increases the crystalline defects density, which should contribute to hardening. Such low hardness values are explained by a rather large amount of primary α-phase after rolling.

Figure 11:
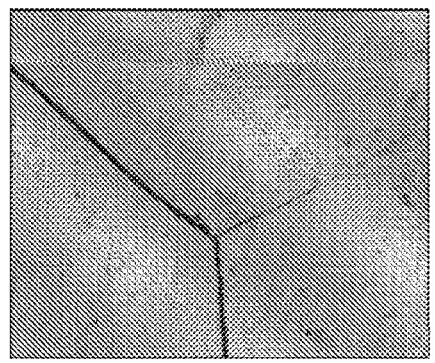
FIG. 11 shows micrographs of Ti-6Al-4V-1Mo-3.5Fe-1Cr-2Zr-2Sn alloy samples after quenching from 860° C. (a), 855° C. (b), 845° C. (c, d), 830° C. (e) and 800° C. (f).
Figure 11:
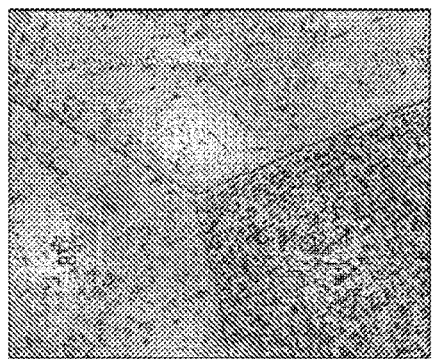
Figure 11:
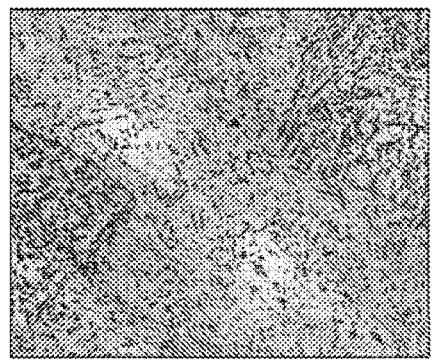
Figure 11:
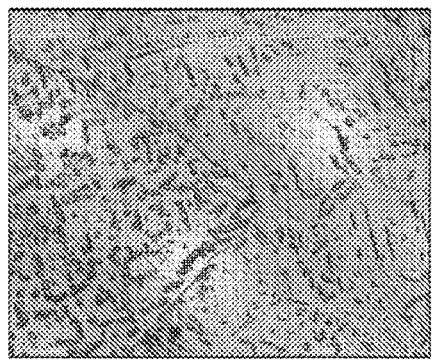
Figure 11:
Figure 11:

In order to select the optimal quenching temperature, it was necessary to determine the β-transition temperature (Tβ). A number of trial quenches were carried out. Samples were heated up to about 800 to 900° C. in steps of 5 to 10° C. and subjected to isothermal annealing for from about 40 minutes to about 2 hours depending on the temperature. After isothermal annealing the samples were cooled in water. The temperature of the α+β→β-transformation (Tβ) was determined by metallographic and X-ray analysis, and was found to be about 860° C. Quenching from a temperature equal to or higher than about 860° C. leads to the formation of β-phase microstructure (see FIG. 11a).

Due to its chemical composition, the Ti-6Al-4V-1Mo-3.5 Fe-1Cr-2Zr-2Sn alloy belongs to the pseudo-β group of titanium alloys. This group is characterized by micro-chemical heterogeneity inside β-phase grains, i.e. there is some difference in chemical composition in adjoining β-grains. This is why reducing the temperature down to about 855° C. results in heterogeneous microstructure formation: some grains are presented by β-phase only, while others also contain primary α-phase (see FIG. 11b). Heat treatment at about 845° C. results in a rather homogeneous microstructure which contains around 10-15 vol % primary α-phase (see FIGS. 11c, d). Reducing the temperature to about 830° C. or less leads to an increase in α-phase (see FIGS. 11e, f). The hardness characteristics after quenching relate to the quantity of primary α-phase (see Table 10).

TABLE 10

Influence of quenching temperature on Ti—6Al—4V—1Mo—3.5Fe—1Cr—2Zr—2Sn alloy hardness

| Quenching Temp (° C.) | 880 | 860 | 855 | 845 | 830 | 800 |
|---|---|---|---|---|---|---|
| Phase composition | β | β | β + 5% α (heterogeneous microstructure) | β + 10-15% α | β + >20% α | β + >20% α |
| Hardness (HRC) | 32-33 | 32-33 | 32-36 | 37-38 | 39-40 | 43-44 |

A single-phase β-microstructure after quenching provides only minimal levels of hardness (about 32 HRC). Heterogeneous microstructure formation (quenching from about 855° C.) causes the hardness to fluctuate between about 32 and about 36 HRC. Reducing the quenching temperature leads to a gradual increase in hardness, which is explained by an increase in the amount of primary α-phase (see Table 10).

In order to provide preferred hardness values of about 52 HRC or more, optimal temperature and ageing times were investigated. Three quenching temperatures (about 860° C., 845° C. and 830° C.) and ageing temperatures (about 475° C., 500° and 525° C.) were chosen. Ageing time was varied from about 4 up to about 70 hours. The results are given in Table 11.

Maximum strengthening, i.e. the greatest difference between initial and final hardness levels, was achieved on samples which had single-phase β-microstructure after quenching. However, the level of hardness obtained did not exceed about 49 HRC. In addition, ageing for more than about 120 hours at the chosen temperatures results in abrupt material brittleness: hardness indentation causes the appearance of small cracks on the surface. It appears that the α-phase, which is formed during low-temperature ageing, has a semicoherent boundary with the matrix, which results in high internal stresses.

The results indicate that ageing for about 70-hours at a temperature of about 475° C. is generally insufficient to achieve the required hardness level. It is likely that ageing for up to 100-150 hours would provide the necessary levels, but this is not reasonable from an economic perspective.

TABLE 11

Influence of ageing temperature and its duration on Ti—6Al—4V—1Mo—3.5 Fe—1Cr—2Zr—2Sn alloy hardness

| Quenching Temp (° C.) | Initial hardness (HRC) | Ageing Temp (° C.) | HRC | | | | | | |
|---|---|---|---|---|---|---|---|---|---|
| | | | 4 h | 8 h | 10 h | 20 h | 30 h | 50 h | 70 h |
| 860 | 33 | 525 | 48.0 | 48.5 | 48.5 | 48.0 | — | — | — |
| | | 500 | — | — | 48 | 49.0 | — | — | — |
| | | 475 | — | — | 47.0 | 48.0 | — | — | — |
| | | 525 | 47.5 | 47.5 | 48.0 | 48.5 | 48.5 | 48.0 | 47.5 |
| 845 | 37 | 500 | — | — | 50.5 | 50.5 | 52 | 51.5 | 51.0 |
| | | 475 | — | — | 49.5 | 49.5 | 50.5 | 50.7 | 51.0 |
| 830 | 39 | 525 | 47.0 | 47.0 | 46.5 | 47.5 | 46.5 | 46.0 | 45.0 |
| | | 500 | — | — | 49.0 | 49.0 | 49.0 | 48.5 | 48.0 |
| | | 475 | | | 49.0 | 49.0 | 49.5 | 49.5 | 49.5 |

Ageing at about 525° C. also does not provide the optimum result due to an increase of diffusion processes. As a result, α-phase particles have a larger size in comparison with ones that are formed at lower temperatures.

The results indicate that the optimum ageing temperature is approximately 500° C. Ageing at this temperature for up to about 30 hours resulted in hardness values of about 52 HRC for the samples that were previously quenched from about 845° C. (see Table 11). It should be noted that α-phase particle precipitation during ageing is highly dispersive: even on images, obtained with the help of scanning electron microscopy with magnification up to 8000, these particles cannot be clearly seen. This is also caused by a semicoherent interphase α/β-boundary.

In summary, the results indicate that particularly high hardness levels can be achieved by quenching from a temperature that is about 15-20° C. lower than Tβ. Such a quench typically provides about 10-15% volume fracture of primary α-phase in the microstructure. Quenching from temperatures that are lower than Tβ allows partial retention of crystalline defects (for example dislocations) accumulated during plastic deformation and in this way contributes to strengthening of the alloy after subsequent ageing. In addition, the presence of a small quantity of α-phase particles allows partial retention of the toughness and the prevention of spontaneous crack formation.

Increasing the quantity of α-phase, caused by reducing the quenching temperature, results in reduction of the strengthening effect due to an increase of β-phase stability and a decrease in the quantity of α-phase, which is formed during ageing. As a result, for a titanium alloy that contains 6.5Al-3.0Fe-0.8Cr-1.1Mo-3.8V-19Zr-2.Sn, high strength can be obtained by quenching from 845° C.±2° C. followed by ageing at about 500° C. for about 30 hours.

Figure 12:
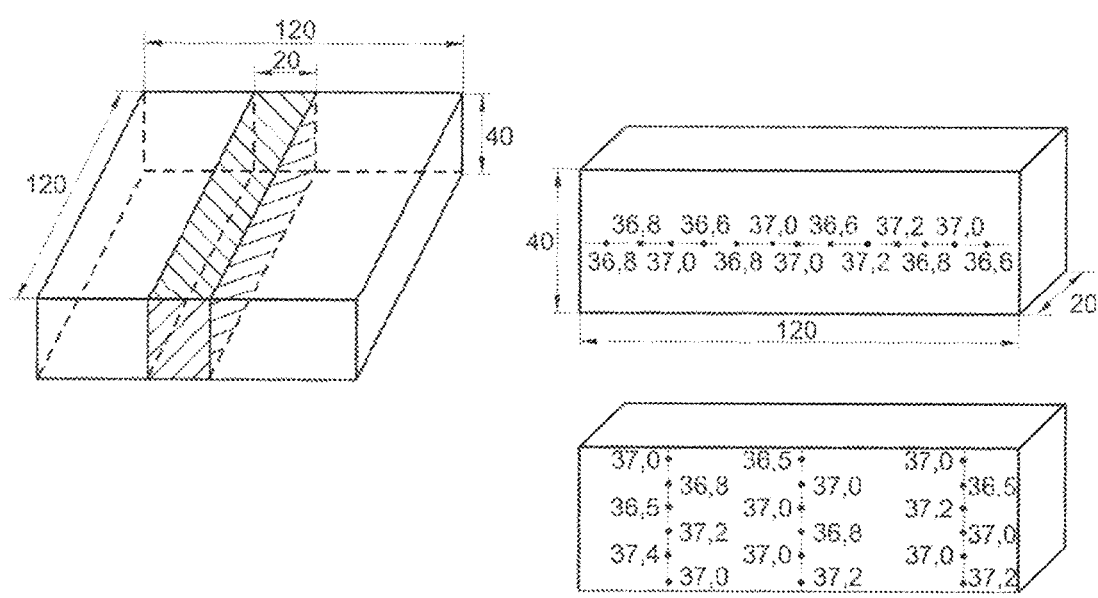
FIG. 12 shows the cutting plan for cutting samples from semiproducts for measurements of the hardness at specific depths, and the corresponding hardness values.

Since titanium alloys exhibit low thermal conductivity, the hardness at various depths was investigated. For that purpose hardness was measured on a central part of a semiproduct previously quenched in water. The cutting plan and obtained hardness values are shown in FIG. 12. The results demonstrate the high hardness throughout the semiproduct and the formation of a homogeneous microstructure after quenching.

Semiproducts approximately 120×120×40 mm in size were placed into a furnace and heated to a temperature of about 845° C. (in approximately 37-40 minutes). The semiproducts were kept in the furnace for another hour and were then quenched in water. In the next stage the semiproducts were machined on a lathe with a programmed numerical control. Rough turning was implemented by a carbide tool (plate) named VK8 (analogue to HT10); speed of rotation n=100 rpm (revolutions per minute) and feed f=0.1 mm/rev. Finish turning of the rings was implemented at n=120 rpm, f=0.05 mm/rev by carbide tool (plate) HT 10 (Mitsubishi) using lubricant-coolant liquid. In addition two semiproducts 120×120×40 mm in size were used to make samples for tensile and impact tests. Some samples were tested after quenching, while others were additionally aged at about 500° C. for about 30 hours. Results of the mechanical tests are presented in Table 12. The mechanical properties were measured according to a uniaxial tensile test (ASTM E8/E8M-11).

TABLE 12

Mechanical properties of titanium alloy Ti6A1—4V—1Mo—3.5 Fe—1Cr—2Zr—2Sn (yield strength, tensile strength, elongation and impact strength)

| Conditions of thermal treatment | $\sigma_{0.2}$ (MPa) | $\sigma_B$ (MPa) | δ (%) | KCU (kJ/m$^2$) |
|---|---|---|---|---|
| 845° C., 1 hour, water cooling | 920 | 1060 | 4.2 | 130.0 |
| 845° C., 1 hour, water cooling + 500° C., 30 hours, air cooling | 1400 | 1400 | — | 42.0 |

Samples of Ti6Al-4V-1Mo-3.5 Fe-1Cr-2Zr-2Sn alloy after quenching have average levels of strength and ductility, whereas after aging they have high strength and practically zero ductility. The alloys were compared with steels used for bearings manufacturing (Russian alloy Fe-1.0C-0.25Si-0.3Mn-1.45Cr). After quenching and annealing, steel has higher hardness (61-64 HRC) and strength (2100 MPa) level, but the impact toughness of bearing steel (50 kJ/m2) is rather close to that of the titanium alloy of the present invention (42 kJ/m2).

Fracture surfaces of destroyed samples were studied. Large facets caused by intergranular failure were observed on the fracture surface of quenched samples. However, it should be noted that all facets have tracks of micro plastic deformation, which can be concluded from their pit structure. Secondary cracks formation as well as flat facets with small pits could also be observed on the fracture surfaces.

The fracture surface of quenched and subsequently aged samples has a brittle character of failure. The fracture surface is also characterised by facets having feebly marked relief. Secondary cracks were almost not observed. Some facets have "river" features, while others have dispersive pit destruction due to precipitation of dispersive α-phase particles inside the grains.

Bearing rings are typically manufactured from quenched material when its hardness is not too high. To achieve the required hardness level (preferably≥52 HRC) it is desirable to conduct ageing at about 500° C. for up to about 30 hours.

Titanium alloys have high oxidation susceptibility. In addition, increasing the volume fraction of β-phase (at the same temperature and duration) results in intensification of the oxidation processes. Ti-6Al-4V-1Mo-3.5Fe-1Cr-2Zr-2Sn is a pseudo-β titanium alloy and has more than 50% β-phase after annealing. Accordingly, the depth of the "alpha"-layer (i.e. layer enriched with oxygen and having higher brittleness) was measured on oblique sections (the load on the indenter was P=50 g) on the Ti6Al-4V-1Mo-35 Fe-1Cr-2Zr-2Sn alloy samples after quenching and ageing at about 500° C. for about 30 hours. This layer was revealed to be about 50 microns thick, as indicated by a drop in harness of from around 6000 MPa at the surface to around 4000 MPa at a depth of 50 microns, after which the hardness remained fairly constant down to 200 microns in depth. Accordingly, final machining of the rings after ageing should preferably remove a layer not less than about 50 microns in depth.

Example 4

Two hot-rolled rods of approximate diameter 30 mm and 25 mm were prepared having the chemical composition set out in Table 13.

TABLE 13

Chemical composition of hot-rolled rods

| Rod diameter | Alloying elements, wt % | | | | | |
|---|---|---|---|---|---|---|
| | Al | Mo | V | Cr | Fe | Base |
| 30 mm | 5.4 | 4.6 | 5.9 | 1.1 | 1.0 | Ti |
| 25 mm | 5.5 | 4.6 | 4.9 | 1.1 | 1.2 | Ti |

Samples were quenched from either about 870° C. (just below Tβ) or about 900° C. (just above Tβ) at a rate of about 30° C./s. They were then aged for varying lengths of time at either about 450° C., 500° C. or 550° C. before being cooled at a rate of about 3° C./s. Hardness values of the samples are set out in Table 14.

TABLE 14

Hardness values achieved for various quenching temperatures, ageing temperatures and ageing times

| Quenching T (° C.) | HRC after quenching | Hardness, HRC (Time of ageing, hours) | | | | |
|---|---|---|---|---|---|---|
| | | Ageing at 450° C. | | | | |
| | | (2) | (4) | (5) | (6) | (10) |
| 900 (25 mm) | 32 | 47 | 48 | 48.5 | 49.5 | 48.5 |
| 870 (25 mm) | 35 | 49 | 49 | 50 | 50 | 50 |
| 900 (30 mm) | 30 | 46 | 46 | 47 | 47 | 47 |
| 870 (30 mm) | 33 | 47 | 47 | 48 | 48.5 | 48.5 |
| | | Ageing at 500° C. | | | | |
| | | (2) | (3) | (4) | (5) | (6) |
| 900 (25 mm) | 32 | 47 | 47 | 48 | 48 | 46 |
| 870 (25 mm) | 35 | 48 | 49 | 49 | 48.5 | 47 |
| 900 (30 mm) | 30 | 46 | 46.5 | 46.5 | 46.5 | 45 |
| 870 (30 mm) | 33 | 47 | 47 | 47.5 | 47.5 | 47 |
| | | Ageing at 550° C. | | | | |
| | | (1) | (2) | (3) | (4) | |
| 900 (25 mm) | 32 | 48 | 48.5 | 47 | 45 | |
| 870 (25 mm) | 35 | 49 | 49 | 48.5 | 47.5 | |
| 900 (30 mm) | 30 | 45 | 46 | 46 | 44 | |
| 870 (30 mm) | 33 | 47 | 47.5 | 47.5 | 46 | |

It can be seen that the ageing treatments result in an increase in hardness.

The foregoing detailed description has been provided by way of explanation and illustration and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for manufacturing a bearing component selected from the group consisting of a rolling element, an inner ring, and an outer ring, the method comprising:
   (i) providing an alloy composition comprising:
      5 to 7 wt % Al,
      3.5 to 6 wt % V,
      0.5 to 6 wt % Mo,
      0.2 to 4.5 wt % Fe,
      0.05 to 2.5 wt % Cr,
      up to 2.5 wt % Zr,
      up to 2.5 wt % Sn, and
      up to 0.5 wt % C;
      the balance being Ti and unavoidable impurities;
   (ii) heating the alloy composition to a temperature T below the (α+β/β)-transition temperature $T_\alpha$ and then quenching; and
   (iii) aging the alloy composition at a temperature of from 400 to 600° C.

2. The method according to claim 1, wherein after the alloy composition has been heated to the temperature T, it is worked before being quenched.

3. The method according to claim 2 wherein the working comprises rolling the alloy composition.

4. The method according to claim 3 wherein the rolling comprises multiple rolling stages with intermediate annealing stages.

5. The method according to claim 1 wherein the temperature T is greater than the (α/α+β)-transition temperature $T_\alpha$ and less than the (α+β/β)-transition temperature $T_\beta$.

6. The method according to claim 1 wherein the temperature T falls within the range of:

$$T_\beta > T \geq T_\beta - 50° C.$$

7. The method according to claim 1 wherein the temperature T is 820 to 900° C.

8. The method according to claim 1 wherein the quenching is carried out in water.

9. The method according to claim 1 wherein the quenching is performed so that the alloy composition has a microstructure comprising from 10 to 15 vol % α-phase after the quenching.

10. The method according to claim 1 wherein the aging is carried out at a temperature of 425 to 525° C.

11. The method according to claim 10 wherein the aging is carried out 25 to 35 hours.

12. The method according to claim 1 wherein the alloy composition comprises:
   5 to 7 wt % Al,
   3.5 to 4.5 wt % V,
   0.5 to 1.5 wt % Mo,
   2.5 to 4.5 wt % Fe,
   0.05 to 2 wt % Cr,
   up to 2.5 wt % Zr,
   up to 2.5 wt % Sn, and
   up to 0.5 wt % C,
   the balance being Ti and unavoidable impurities.

13. The method according to claim 1 wherein the alloy composition comprises:
   5.5 to 6.5 wt % Al,
   3.5 to 4.5 wt % V,
   0.5 to 1.5 wt % Mo,
   3.5 to 4.5 wt % Fe,
   0.05 to 2 wt % Cr,
   1.5 to 2.5 wt % Zr,
   1.5 to 2.5 wt % Sn, and
   0.01 to 0.2 wt % C,
   the balance being Ti together with unavoidable impurities.

14. The method according to claim 1 wherein the alloy composition comprises:
   5 to 7 wt % Al,
   3.5 to 6 wt % V,
   3 to 6 wt % Mo,
   0.2 to 2.5 wt % Fe,
   0.1 to 2.3 wt % Cr,
   up to 0.7 wt % Zr,
   up to 0.7 wt % Sn, and up to 0.5 wt % C, the balance being Ti and unavoidable impurities.

15. The method according to claim 1 wherein the quenching is performed so that the alloy composition has a Rockwell harness of at least 50 HRC after the quenching.

16. The method according to claim 1 wherein the alloy composition has a microstructure that comprises β-phase having precipitates of α-phase dispersed therein, the α-phase comprising 10-20 vol % of the microstructure.

17. The method according to claim 1, further comprising:
machining the alloy composition into a desired shape of the bearing component, the machining being carried out between the quenching and the aging.

18. The method according to claim 17 wherein after the aging, the machining is performed to remove a layer not less than 50 μm in depth from the bearing component.

19. The method according to claim 1 wherein the bearing component is an inner ring or an outer ring.

20. The method according to claim 1 wherein the temperature T is from 835 to 880° C.

21. The method according to claim 20 wherein the quenching is carried out at a rate of at least 20° C./s to a temperature of 60° C. or lower.

22. The method according to claim 21 wherein the aging is performed at 425 to 525° C. degrees C. for about 25-35 hours, and then the bearing component is cooled at a rate of from 2 to 10° C./s.

23. The method according to claim 1, wherein V is 3.5-4.5 wt %, Mo is 0.5-1.5 wt %, Fe is 2.5-4.5 wt % and Cr is 0.05-2 wt %.

24. The method according to claim 1 wherein the alloy composition has a molybdenum equivalence $[Mo]_{eq}$ that is from 10 to 12, the molybdenum equivalence being calculated according to the following formula:

$$[Mo]_{eq}=[Mo]+0.2[Ta]+0.28[Nb]+0.4[W]+0.67[V]+1.25[Cr]+1.25[Ni]+1.7[Mn]+1.7[Co]+2.5[Fe].$$

25. The method according to claim 1, wherein Al is 6-6.5 wt %.

26. The method according to claim 1, wherein V is 3.5-4.5 wt %.

27. The method according to claim 1, wherein Fe is 2.5-4.5 wt %.

28. The method according to claim 1, wherein Cr is 0.06-1.5 wt %.

29. The method according to claim 1, wherein Zr is 1-2.5 wt %.

30. The method according to claim 1, wherein Sn is 1.5-2.5 wt %.

31. The method according to claim 1, wherein C is 0.015-0.35 wt %.

32. The method according to claim 1 wherein the temperature T falls within the range of:

$$T_\beta > T \geq T_\beta - 30° C.$$

33. The method according to claim 1 wherein the temperature T falls within the range of:

$$T_\beta - 10° C. \geq T \geq T_\beta - 20° C.$$

34. A method for manufacturing a bearing component selected from the group consisting of a rolling element, an inner ring, and an outer ring, the method comprising:
(i) providing an alloy composition comprising:
5 to 7 wt % Al,
3.5 to 6 wt % V,
0.5 to 1.5 wt % Mo,
0.2 to 4.5 wt % Fe,
0.05 to 2.5 wt % Cr,
up to 2.5 wt % Zr,
up to 2.5 wt % Sn, and
up to 0.5 wt % C;
the balance being Ti and unavoidable impurities;
(ii) heating the alloy composition to a temperature T below the (α+β/β)-transition temperature $T_\beta$ and then quenching; and
(iii) aging the alloy composition at a temperature of from 400 to 600° C.

* * * * *